US012021185B2

United States Patent
Maughan

(10) Patent No.: US 12,021,185 B2
(45) Date of Patent: Jun. 25, 2024

(54) CYANIDE ARGYRODITE SOLID ELECTROLYTE

(71) Applicant: Alliance for Sustainable Energy, LLC, Golden, CO (US)

(72) Inventor: Annalise Elizabeth Maughan, Westminster, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 190 days.

(21) Appl. No.: 17/206,100

(22) Filed: Mar. 18, 2021

(65) Prior Publication Data
US 2021/0328257 A1     Oct. 21, 2021

Related U.S. Application Data

(60) Provisional application No. 62/991,415, filed on Mar. 18, 2020.

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/0068* (2013.01)

(58) Field of Classification Search
CPC .................. H01M 10/0562; H01M 2300/0068
See application file for complete search history.

(56) References Cited

U.S. PATENT DOCUMENTS

2010/0290969 A1*  11/2010  Deiseroth ......... H01M 10/0562
                                                                          423/303

OTHER PUBLICATIONS

Yubuchi, So, et al. "An argyrodite sulfide-based superionic conductor synthesized by a liquid-phase technique with tetrahydrofuran and ethanol." Journal of Materials Chemistry A 7.2 (2019): 558-566. (Year: 2019).*
Reddy, Mogalahalli V., et al. "Sulfide and oxide inorganic solid electrolytes for all-solid-state Li batteries: a review." Nanomaterials 10.8 (2020): 1606. (Year: 2020).*
Bachman, J.C. et al., "Inorganic Solid-State Electrolytes for Lithium Batteries: Mechanisms and Properties Governing Ion Conduction," ACS Chemical Reviews, vol. 116, 2016, 23 pages.
Dao, A.H. et al., "Improvement of the ionic conductivity on new substituted borhydride argyrodites," Solid State Ionics, vol. 339, 2019, 6 pages.
Dietrich, C. et al., "Synthesis, Structural Characterization, and Lithium Ion Conductivity of the Lithium Thiophosphate Li2P286," Inorganic Chemistry, vol. 56, 2017, 7 pages.
Gao, Z. et al., "Promises, Challenges, and Recent Progress of Inorganic Solid-State Electrolytes for All-Solid-State Lithium Batteries," Advanced Materials, vol. 30, 2018, 27 pages.
Jansen, M., "Volume Effect or Paddle-Wheel Mechanism—Fast Alkali-Metal Ionic Conduction in Solids with otationally Disordered Complex Anions," Angew. Chem. Int. Ed. Engl., vol. 30, 1991, 12 pages.

(Continued)

*Primary Examiner* — Sadie White
*Assistant Examiner* — Kayla Elaine Clary
(74) *Attorney, Agent, or Firm* — Sam J. Barkley

(57) ABSTRACT

Disclosed herein are new argyrodite compositions of matter, including, for example, $Li_6PS_5CN$, and methods for making the same.

3 Claims, 10 Drawing Sheets

(56) References Cited

OTHER PUBLICATIONS

Kraft, M.A. et al., Influence of Lattice Polarizability on the Ionic Conductivity in the Lithium Superionic Argyrodites $Li_6PS_5X$ (X = Cl, Br, I), J. Am. Chem. Soc., vol. 139, 2017, 10 pages.

Muy, S. et al., "Tuning mobility and stability of lithium ion conductors based on lattice dynamics," Energy & Environmental Science, vol. 11, 2018, 10 pages.

Rao, R. Prasada et al., "Formation and conductivity studies of lithiium argyrodite solid electrolytes using in-situ neutron diffraction," Solid State Ionics, vol. 230, 2013, 5 pages.

\* cited by examiner

CYANIDE ARGYRODITE SOLID ELECTROLYTE

CROSS-REFERENCE TO RELATED APPLICATIONS

This application claims priority under 35 U.S.C. § 119 to U.S. provisional patent application No. 62/991,415 filed on 18 Mar. 2020, the contents of which are hereby incorporated in their entirety.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

BACKGROUND

Solid-state batteries require a solid electrolyte to conduct ions between the two electrodes. Benefits of solid electrolytes over liquid electrolytes include higher energy densities, improved thermal and electrochemical stability and increase safety and lower flammability. However, solid state electrolytes typically exhibit lower ionic conductivities than liquid electrolytes.

SUMMARY

In an aspect, disclosed is a composition of matter comprising cyanide argyrodite. In an embodiment, the cyanide argyrodite is capable of being used as a solid electrolyte. In an embodiment, the cyanide argyrodite is capable of being used in a solid-state battery. In another embodiment, the cyanide argyrodite is used within a solid-state battery that comprises a solid-state lithium ion battery.

In an aspect, disclosed herein is a method of making a cyanide argyrodite.

Other objects, advantages, and novel features of the present invention will become apparent from the following detailed description of the invention when considered in conjunction with the accompanying drawings.

BRIEF DESCRIPTION OF THE DRAWINGS

FIG. 3 depicts a Williamson-Hall analysis of the SXRD data for cubic $Li_6PS_5CN$ (teal circles) and $Li_6PS_5Br$ (orange squares). The dashed lines represent linear regressions for each data set and the identity of the reflections are indicated by the $\{hkl\}$ values on the plot.

DETAILED DESCRIPTION

All-solid-state batteries require a solid electrolyte to conduct ions between the two electrodes, yet ion conduction through solids is typically slow. Without being limited by theory, the presence of the cyanide ion in the argyrodite structure is thought to enhance lithium ion conductivity via a paddlewheel mechanism in which rotations of the cyanide molecules couple to lithium ion motion in order to lower the activation barriers for ionic conductivity.

Known compounds, such as $Na_3OCN$, $Na_3OBH_4$, and $Li_6PS_5Br(BH_4)$ also exhibit enhanced ionic conductivity duo to rotational dynamics. However, these known materials do not exhibit ionic conductivities high enough to be competitive with liquid electrolytes and/or are difficult to synthesize and stabilize. The new argyrodite materials disclosed herein, including, for example, $Li_6PS_5CN$, can be synthesized from solution at low temperatures that enable solution-based deposition for increase ease of synthesis and use.

In an embodiment, disclosed herein are novel argyrodite materials and methods for making the same. In an embodiment, disclosed herein are methods for making new argyrodite materials containing a cyanide ion as a solid electrolyte for all-solid-state lithium ion batteries. In an embodiment, argyrodite materials disclosed herein can be used to exploit coupled electrochemical and physical phenomena to manipulate and increase rates of ion transport. In another embodiment, materials are disclosed herein that consider lattice dynamics as a design principle to engineer desirable properties in functional solid-state materials.

Structure

Figure 1:
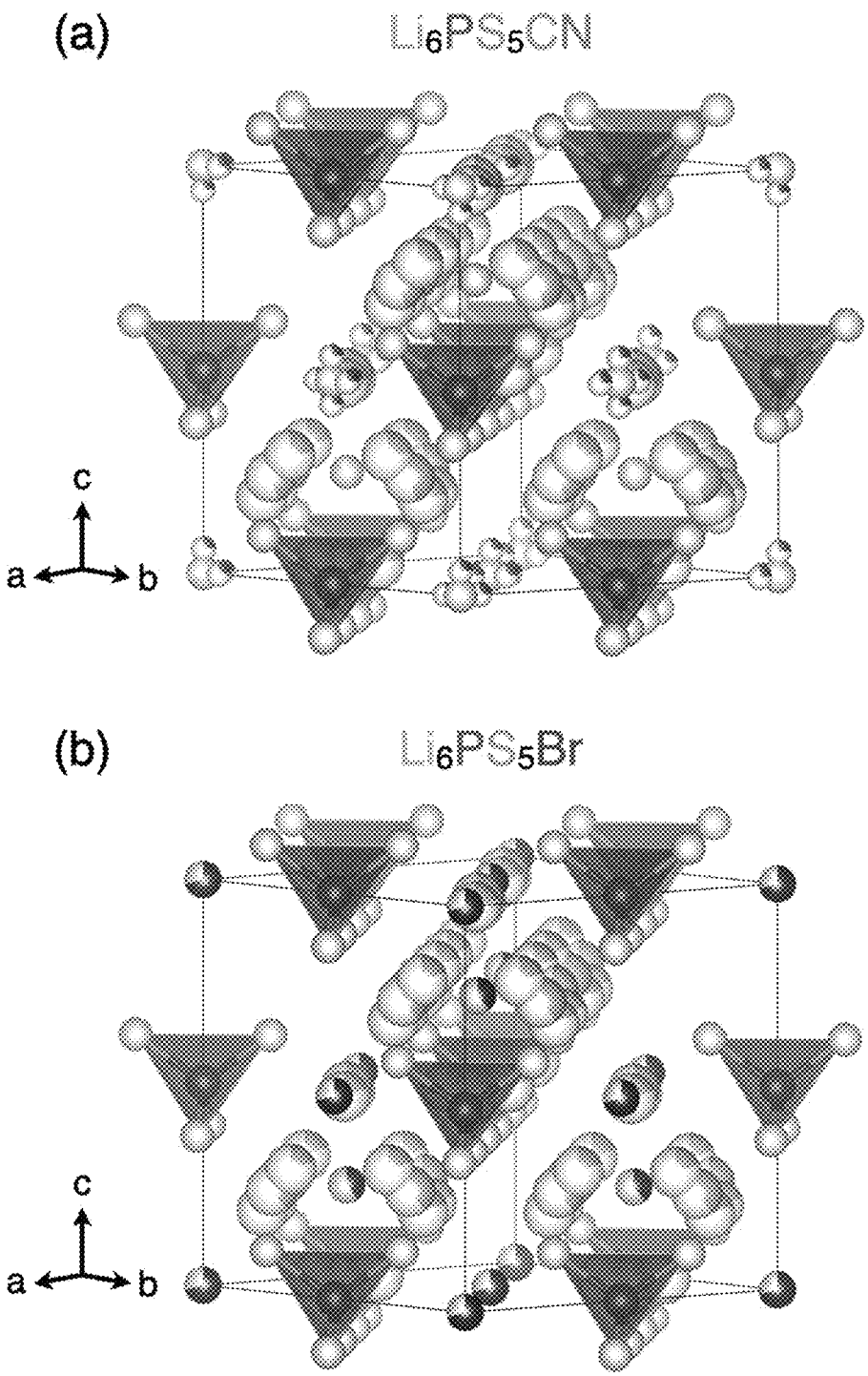
FIG. 1 depicts crystal structure representation of the cyanide argyrodite $Li_6PS_5CN$ (a) and the bromide argyrodite $Li_6PS_5Br$ (b). Both compounds crystallize in the cubic argyrodite structure (space group F-43m). Lithium ions are green, phosphorus are teal, sulfur are yellow, carbon are orange, nitrogen are blue, and bromine are magenta. Partially shaded spheres represent fractional site occupancies from determined from Rietveld refinements.

The new electrolyte material $Li_6PS_5CN$ crystallizes in the same cubic argyrodite structure (space group F-43m) familiar to the reported $Li_6PS_5Br$ analog. The structure is composed of isolated thiophosphate tetrahedra with the halide and excess sulfur ions site-disordered at the 4a and 4d Wycoff sites within the structure. The mobile lithium species are distributed within the interstices. A crystal structure representation of $Li_6PS_5CN$ is shown in FIG. 1. In $Li_6PS_5CN$, the cyanide ions are hypothesized to be orientationally disordered, and thus the cyanide ion has been represented with fractional occupancies of the carbon and nitrogen atoms about the 4a and 4d Wycoff sites.

Figure 2:
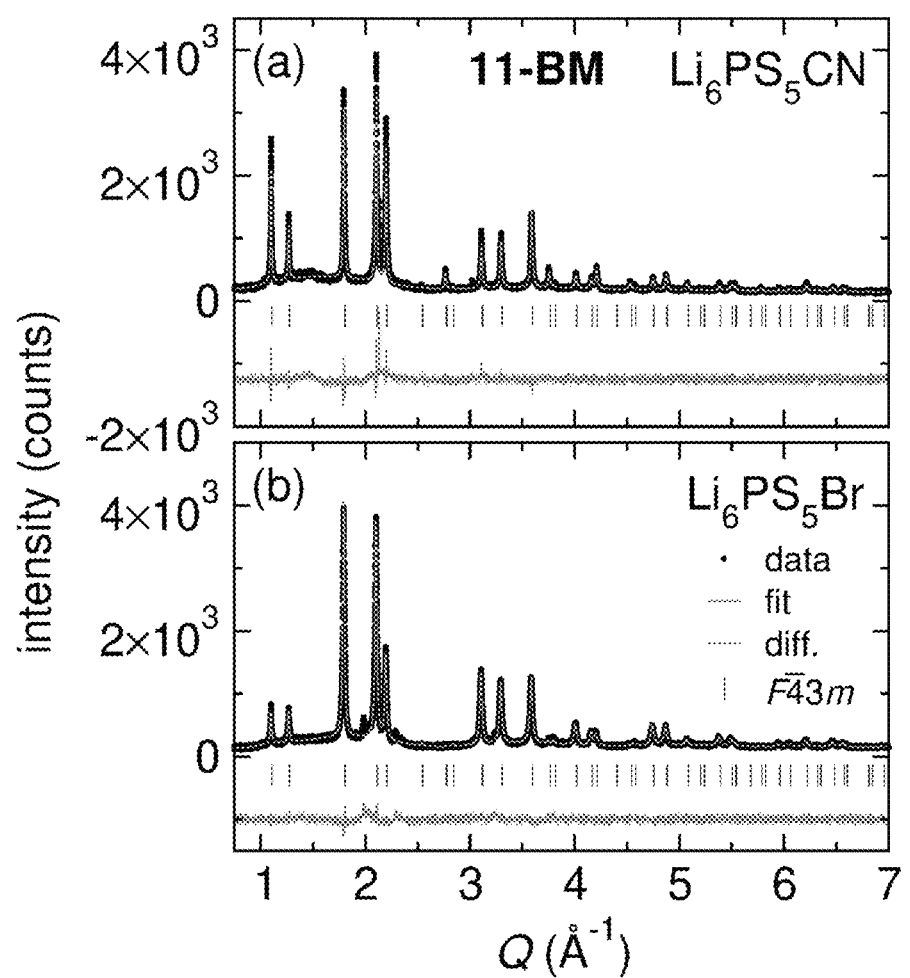
FIG. 2 depicts Rietveld refinement of the cubic argyrodite structure of (a) $Li_6PS_5CN$ and (b) against the high-resolution powder X-ray diffraction data collected at the 11-BM-B beamline. Data are black circles, the fit is the orange line, and the difference is the grey line. The purple tick marks represent the positions of anticipated reflections for the cubic argyrodite structure (space group F43m).

Structural analysis of $Li_6PS_5CN$ was accomplished through laboratory powder X-ray diffraction (PXRD) measurements. The data were modeled by the least-squares Rietveld method implemented in GSAS/EXPGUI. As shown in FIG. 2, the PXRD data for $Li_6PS_5CN$ are well-described by the cubic argyrodite structure (space group F-43m).

Electrochemical Impedance Spectroscopy

The bulk lithium ion conductivity of $Li_6PS_5CN$ was determined by AC electrochemical impedance spectroscopy (EIS). EIS measurements were collected on symmetric cells using blocking stainless steel foil electrodes housed within stainless steel Swagelok cells. The ionic conductivity was extracted by fitting the EIS data using the equivalent circuit method. At T=35° C., $Li_6PS_5CN$ exhibits bulk ionic conductivity of $\sigma=1.0(2)\times10^{-5}$ S/cm. This value is approximately one order of magnitude lower than that of the $Li_6PS_5Br$ analog prepared by the same synthetic protocol ($\sigma=1.3\times10^{-4}$ S/cm);[1] however, the value for ionic conductivity extracted from EIS data may be strongly influenced by other factors such as grain-boundary resistance. Therefore, it is more useful to compare the activation barriers for lithium ion conduction in these materials.

Figure 3:
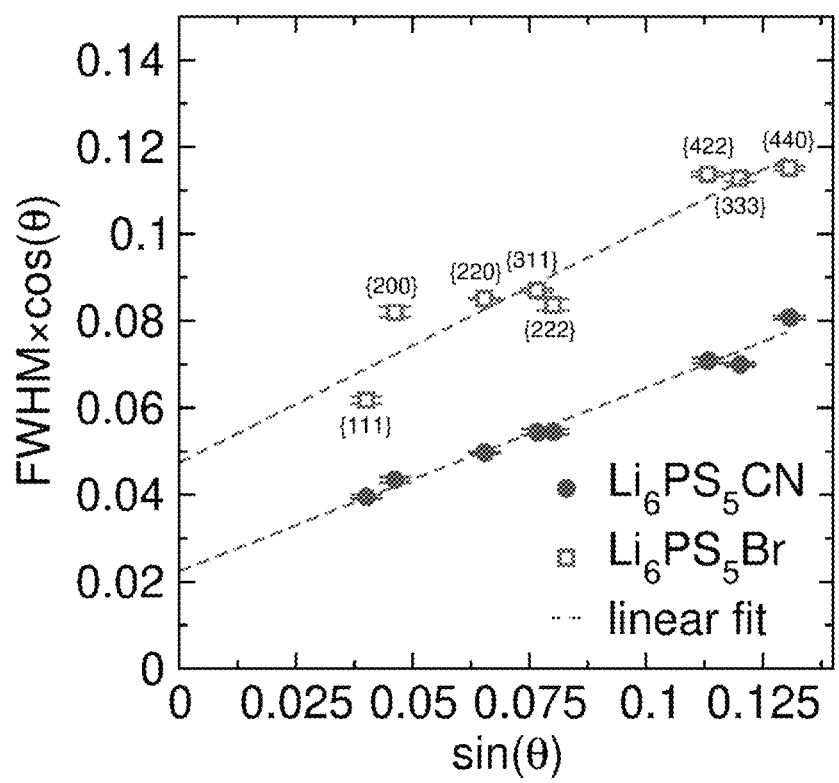
FIG. 3 depicts Arrhenius plots for lithium ion conductivity extracted from temperature dependent EIS data for $Li_6PS_5CN$. The solid line is a linear regression.

The activation barriers ($E_a$) for lithium ionic conductivity in $Li_6PS_5CN$ were determined by collecting the EIS data as a function of temperature according to the modified Arrhenius relationship shown in Equation 1, $$\sigma T = \sigma_0 e^{-E_a/k_B T} \qquad \text{Equation 1}$$

where $E_a$ is the activation barrier, a is the ionic conductivity, T is temperature, and $k_B$ is the Boltzman constant. The Arrhenius plot for the lithium ionic conduction processes is shown in FIG. 3. The linear relationship in the Arrhenius plot for $Li_6PS_5CN$ is consistent with a thermally activated process, and the low resistivity values extracted from fitting the EIS data suggest that this process corresponds with lithium ion conduction. From these data, the activation barrier for lithium ion conductivity was determined to be $E_a=242\pm47$ meV.

The activation barrier for lithium ion conduction in $Li_6PS_5CN$ is significantly lower than that reported for samples of $Li_6PS_5Br$ that were synthesized by the same method. Yubuchi, et al. reported an activation barrier of $E_a=444$ meV for lithium ion conductivity in $Li_6PS_5Br$, which is over 100 meV higher than that observed for $Li_6PS_5CN$ as disclosed herein. This observation indicates that incorporating cyanide into the argyrodite structure serves to lower the activation barrier for lithium ionic conductivity.

Without being bound by theory, there are several plausible origins for the lower activation energy for ion conduction in $Li_6PS_5CN$. One hypothesis is that coupled motions between reorientations of the dipolar cyanide ion and mobile lithium ions serves to facilitate mobile ion hopping between neighboring sites within the crystal which in turn lowers the activation energy for this hopping process through a "Paddlewheel" mechanism. This hypothesis relies on the presence of cyanide reorientational dynamics that are not only active at the measured temperatures, but are also coupled to the lithium ion dynamics. An alternative hypothesis is that, in the absence of reorientational dynamics, the static dipolar cyanide ion acts to screen the interaction between the mobile lithium ions and the surrounding host lattice, which reduces the barrier for hopping conductivity of the lithium ions. While these hypotheses are both compelling, further work is necessary to understand the atomistic role of cyanide in driving ion conduction processes in the new argyrodite material $Li_6PS_5CN$.

Preparation of the New Argyrodite Solid Electrolyte $Li_6PS_5CN$ $Li_6PS_5CN$ was prepared by modification of the solution-phase synthesis of $Li_6PS_5Br$ reported by Yubuchi, et al (J. Mater. Chem. A 2019, 7 (2), 558-566). To a dry 100 mL Schlenk flask was added 0.2701 g $P_2S_5$ (1.2 mmol) and 0.1673 g (3.6 mmol) of $Li_2S$. The flask was connected to an $N_2$ Schlenk manifold and kept under flowing $N_2$ for the duration of the experiment. Approximately 20 mL of anhydrous tetrahydrofuran (THF) was added via cannula, and the solution was stirred for 2 h to form a yellow suspension. To a second dry 100 mL Schlenk flask was added 0.1262 g (2.4 mmol) LiCN.0.25DMF and 0.1116 g (2.4 mmol) $Li_2S$. Approximately 20 mL of dry ethanol was added via cannula and stirred to dissolve into a clear solution. The ethanolic solution was then transferred to the THF solution via cannula to yield an emerald green transparent solution. The combined solution was then stirred for an additional 20 min. The solvent was evaporated under vacuum at room temperature to yield a white precipitate, and the product was dried under vacuum at T=150° C. Yield=62.7%. While the literature preparation of $Li_6PS_5Br$ by Yubuchi, et al. describes an additional annealing step at T=550° C. to improve crystallinity, it was discovered herein that annealing at elevated temperatures beyond T=150° C. causes $Li_6PS_5CN$ to turn deep black.

AC Electrochemical Impedance Spectroscopy

AC electrochemical impedance spectroscopy (EIS) was used to probe the ionic conductivity of $Li_6PS_5CN$. Two-electrode cells were prepared following the method outlined by Martinolich, et al. (Chem. Mater. 2019, 31 (10), 3652-3661). Approximately 35 mg of $Li_6PS_{-5}CN$ were pressed into a pellet (O.D.=6 mm) for 2 minutes at 10 MPa. The pellet was loaded into a 0.25" stainless steel Swagelok cell lined with Kapton film. The pellet was contacted on either side with 0.001" stainless steel foil blocking electrodes and stainless steel rods were used to uniformly press the foil onto the faces of the pellet. EIS data were collected on a BioLogic VMP3 Potentiostat. The frequency was swept from 1 MHz to 500 Hz with an applied DC bias of 100 mV. For temperature-dependent studies, the cell was placed in a convection oven, electrically insulated from the surroundings, and allowed to equilibrate at each temperature for 20 minutes prior to collecting data.

Lithium-ion all-solid-state batteries (ASSBs) hold the potential meet the rising demand for safe and energy-dense energy storage technologies for applications in electric vehicles or grid-scale energy storage. Replacing the liquid electrolyte with a solid-state ion conductor offers several key advantages for emerging ASSB technologies, including improved thermal and mechanical stability, reduced flammability risks, and potential use with lithium metal anodes for high-energy-density batteries.1 However, solid-state ion conductors typically exhibit ionic conductivities that are several orders of magnitude lower than their liquid counterparts, which does not meet the transport kinetics necessary for applications such as electric vehicles. A prevailing challenge for ASSBs is therefore identifying solid-state ion conductors with ionic conductivities that are comparable to or higher than conventional liquid electrolytes.

Halide argyrodites Li6PS5X (X=Cl—, Br—, I—) are among the top candidates for ASSBs, as they are composed of earth-abundant elements and can exhibit ionic conductivities up to 10-2-10-3S cm-1,2,3,4,5 which are nearly competitive with conventional liquid electrolytes. Further, the mechanical softness of the argyrodites can improve interfacial contact and prevent material cracking or electrode-electrolyte delamination that contribute to battery failures.6,7 Given their advantageous properties, the halide argyrodites have recently been the subject of intense research focus, with many of these studies aimed at tuning the structure, bonding, and chemistry of the argyrodite host structure to maximize the ionic conductivity. The halide argyrodite structure is comprised of isolated thiophosphate tetrahedra bridged by halide and ionic sulfide ions. The lithium ions are disordered and distributed within the interstices. At the halide site, replacing chloride with bromide affords a softer lattice with larger bottlenecks for lithium diffusion which lowers the activation barrier for ionic conductivity in the champion material Li6PS5Br.2,3,4,5 Tuning the concentration of lithium vacancies through aliovalent substitution provides another synthetic handhold to tune the ionic conductivity.8? While both of these approaches have demonstrated promise in tuning the properties of argyrodite solid electrolytes, both methods reach a point of diminishing returns where the activation barrier is minimized (and ionic conductivity is maximized) at an optimum lattice volume/vacancy concentration.9 These approaches are fundamentally limited by the available chemistry of the argyrodite structure and rapid advancements in these candidate solid electrolyte materials demand unique approaches to tune the ion conduction properties.

Quantized, coherent dynamics of the host lattice surrounding the mobile ion play a crucial role in dictating ion conduction processes in solid state materials and have recently been explored as an approach to designing solid materials with advantageous ion conduction properties. A higher dielectric constant and softening of the host lattice dynamics surrounding the mobile ion reduce the activation barriers for ion migration, due to a flattened potential landscape that increases the probability for ion diffusion.10, 11,12,13 Introducing softer and more polarizable ions in the host lattice is an effective approach to tune the vibrational landscape of solid-state ion conductors.13 In the halide argyrodites, halide site mixing in Li6PS5Cl1−xBrx and Li6PS5Br1-xIx14 and substitution of sulfide with selenide in Li6+xPS5-xSexI15 are both accompanied by a softening of the agyrodite lattice dynamics and a subsequent increase in the ionic conductivity.

Rotational dynamics of polyhedral and molecular species may further be exploited as an additional avenue to enhance ionic conductivity in solid-state ion conductors via the "paddle wheel" mechanism,16 in which rotational dynamics of these species couple to hopping of mobile ions to promote long-range diffusion. Coupled dynamics between the polyhedral framework and mobile ions have been demonstrated to enhance ionic conductivity in several materials systems, including Li2SO4,17 Na3PO4,18 Ag3PO4,19 and the closoborates Na2(B12H12)0.5(B10H10)0.5.20 The impacts of rotational dynamics upon ionic conductivity may be further enhanced by incorporating dynamic molecular species into pre-existing solid-state electrolyte materials. Halogen-like molecular species, including the superhalogens (e.g., $BH_4^-$, $BF_4^-$, $AlH_4^-$) and pseudohalogens (e.g., OH—, CN—, SCN—) mimic the coordination preferences of halides, and can therefore be easily substituted into solid-state ion conductors such as antiperovskites ($A_3OX$, $A=Li^+$, $Na^+$) or halide argyrodites ($Li_6PS_5X$, $X=Cl^-$, $Br^-$, $I^-$) to introduce additional dynamic degrees of freedom. This is illustrated by the solid-state ion conductors $Li_3OBH_4$,[21] $Na_3OBH_4$,[22] and $Na_3OCN$,[23] which exhibit higher ionic conductivities than their halide counterparts, although the role of molecular dynamics in these materials is not entirely clear. The "paddle wheel" mechanism has been demonstrated by quasi-elastic neutron scattering studies of the hydroxyl-containing antiperovskite $Li_2OHCl$.[24] Similarly, introducing $BH_4^-$ ions in the argyrodite $Li_6PS_5Cl_{1-x}(BH_4)_x$ increases the ionic conductivity compared to $Li_6PS_5Cl$.[25] While many of these studies implicate molecular dynamics in reducing the activation barrier for ion migration, it is often challenging to deconvolute and isolate the conflating impacts of lattice expansion and mobile ion vacancies from molecular dynamics, which complicates a fundamental understanding of the interplay of these factors.[16]

In this work, we have synthesized the new argyrodite solid electrolyte $Li_6PS_5CN$ in which the halide site is occupied by the cyanide ion. The similar ionic radii of cyanide and bromide produce argyrodite structures with nearly identical lattice parameters and Li—Li jump distances, which enables us to deconvolute the effect of lattice volume from the impact of the intrinsic properties and behavior of the cyanide ion within the argyrodite lattice upon the ionic conductivity. From electrochemical impedance spectroscopy, we find that incorporation of the cyanide ion reduces the activation barrier for lithium ion migration compared to the champion bromide argyrodite $Li_6PS_5Br$. High-resolution powder X-ray diffraction data indicate that the cyanide ion is orientationally disordered within the crystal structure which suggests that the cyanide ions may be dynamically reorienting within the structure at room temperature. The lower activation barrier for lithium-ion migration in $Li_6PS_5CN$ compared to the champion halide argyrodite $Li_6PS_5Br$ illustrates how molecular species may be leveraged to tune the energetic landscape for ionic conductivity in solid-state electrolytes for advances in all-solid-state battery technologies.

Results

Structures of $Li_6PS_5CN$ and $Li_6PS_5Br$

The solution-processed argyrodites $Li_6PS_5CN$ and $Li_6PS_5Br$ crystallize in the cubic argyrodite structure (space group F-43m). The argyrodite structure is characterized by isolated thiophosphate tetrahedra spaced by sulfur and bromide/cyanide ions. The lithium ions are distributed in the remaining interstitial voids, as shown in FIG. 1. High-resolution synchrotron powder X-ray diffraction (SXRD) data are consistent with both compounds adopting the cubic argyrodite structure.

In order to quantify the structural differences between solution-processed argyrodites $Li_6PS_5Br$ and $Li_6PS_5CN$, we performed Rietveld refinements of the cubic argyrodite structures against high-resolution synchrotron powder X-ray diffraction (SXRD) data. A model structure for the new cyanide argyrodite $Li_6PS_5CN$ was constructed by introducing cyanide ions around the 4a (0, 0, 0) and 4d (0.75, 0.75, 0.75) Wyckoff sites using the reported C—N bond distance of 1.18 Å.[26] As the cyanide are likely to be orientationally disordered (either statically or dynamically), we have elected to represent this disorder with the large site multiplicity of the cyanide ions at these sites in the structure. Rietveld refinement of the cyanide argyrodite structure against the SXRD data yields a lattice parameter of 9.90140 (6) Å. In the refinement, the occupancies of the cyanide and sulfur ions at the 4a and 4d Wyckoff sites were refined independently. By this method, we found that the occupancy of the cyanide ions at the 4d Wyckoff site converged to zero, while the occupancy of cyanide at the 4a Wyckoff site refined to 0.12(1). This observation suggests that the cyanide ions preferentially occupy the 4a sites at the corners and faces of the cubic unit cell. This is similar to the halide site occupation observed in the iodide argyrodite $Li_6PS_5I$, in which the iodide ions only occupy the 4a site but not the 4d site.[3,27,28] Attempts to refine the Li positions and occupancies resulted in non-physical values likely due to the low scattering power of the small lithium ions. Thus, the Li occupancies were determined based on the refined stoichiometry of the S and CN ions to charge balance the structure. The refined occupancies of the sulfur and cyanide ions at these sites within the structure results in a nominal stoichiometry of $Li_{6.816}PS_{5.488}(CN)_{0.72}$, indicating that the final stoichiometry is likely a sulfur-rich/cyanide-poor variant of the halide argyrodite structure. This points to a compositional intermediary between the all-sulfide argyrodite $Li_7PS_6$ and $Li_6PS_5CN$. In the interest of simplicity, we will refer to $Li_{6.816}PS_{5.488}(CN)_{0.72}$ as $Li_6PS_5CN$ throughout the remainder of this work. Structural parameters from the refinement are presented in Table 1.

A similar approach was employed in the Rietveld refinement $Li_6PS_5Br$ prepared by the same solution-phase methods as $Li_6PS_5CN$. Rietveld refinement of the $Li_6PS_5Br$ structure yields a refined lattice parameter of 9.915 03(7) Å, which is slightly larger than the value of 9.901 40(6) Å determined for the cyanide argyrodite. We attribute this observation to the larger radius of the bromide ion (r=1.96 Å)[29] compared to the radius of cyanide (r=1.92 Å),[30] which results in a slight expansion of the lattice. The lattice parameter of $Li_6PS_6Br$ synthesized by solution-based methods here is slightly smaller than the value of 9.980(8) Å previously reported for $Li_6PS_5Br$ synthesized by traditional high-temperature solid-state reaction.[27,31] The occupancies of the sulfur and bromide ions at the 4a and 4d Wyckoff sites were allowed to refine independently to determine the degree of $S^{2-}/Br^-$ site mixing. The bromide occupancies refined to 0.764(6) and 0.392(2) for the 4a and 4d sites, respectively. This is in contrast to $Li_6PS_5CN$, in which there do not appear to be cyanide ions at the 4d site. Similarly to the Rietveld refinement of $Li_6PS_5CN$, the Li occupancies were determined based upon the refined occupancies of the bromide and sulfide ions in the structure. This gives a refined stoichiometry of $Li_{5.856}PS_{4.883}Br_{1.099}$, which we will refer to as $Li_6PS_5Br$ through the remainder of this work. Structural parameters from the refinement can be found in Table 2. We also note the presence of a small LiBr impurity, as evidenced by the low-intensity reflections at Q=1.97 Å$^{-1}$ and Q=2.29 Å$^{-1}$.

It is interesting to consider the qualitative differences between the SXRD patterns of Li6PS5CN and Li6PS5Br. Notably, the intensities of the {111} and {200} reflections at Q~1.9 Å-1 and Q~1.3 Å-1 in Li6PS5CN are significantly reduced compared to those in Li6PS5Br. In the argyrodite structure, the {111} planes lie along the body diagonal of the cubic unit cell and are comprised mainly of the X-site and sulfide ions at the 4a Wyckoff site that occupy the corners and faces of the unit cell. The {200} plane intersects the bromide/cyanide and sulfide ions on the faces of the unit cell, as well as the phosphorus atoms of the thiophosphate tetrahedra. As the scattering from these planes arises predominantly from the X-site ions, we attribute the reduced intensity of these features in Li6PS5CN to the lower Z of carbon and nitrogen compared to bromide. Orientational disorder of the cyanide ions about the 4a site further contributes to the reduced intensity of these features through diffuse scattering.

The SXRD patterns of both Li6PS5CN and Li6PS5Br both reveal fairly broad reflections compared to the diffraction patterns of argyrodites prepared by high-temperature solid-state reactions.31 In order to deconvolute the contributions from lattice strain and particle size to the observed broadening, we performed a Williamson-Hall analysis of the SXRD data in FIG. 2. As shown in FIG. 3, the full-width at half-maximum of the eight strongest reflections are plotted as FWHM·cos(θ) vs. sin(θ). Prom qualitative inspection of the Williamson-Hall plot, the Q-dependent broadening appears to follow the same trend for both Li6PS5CN and Li6PS5Br, as evidenced by the similar slopes of the linear regressions, which indicates that contributions from strain broadening are similar in both compounds. This indicates that incorporation of the dipolar, dumbell-shaped cyanide ion does not result in significant lattice strain in Li6PS5CN compared to Li6PS5Br. In contrast, the y-intercept for of Li6PS5Br is approximately twice the y-intercept value for Li6PS5CN. As the particle size is inversely proportional to the y-intercept of the Williamson-Hall plot,32 we can conclude that the crystallite sizes in Li6PS5CN are larger than those in Li6PS5Br and this observation is likely responsible for the differences in peak broadening between the two compounds. Zhou et al. noted that solution-synthesized argyrodites typically exhibit poor crystallinity and small particle sizes and require high-temperature annealing to improve the crystallinity.33 In the present study, we have elected to forgo the high-temperature annealing step due to thermal degradation of Li6PS5CN, which will be discussed in more detail below.

Figure 4:
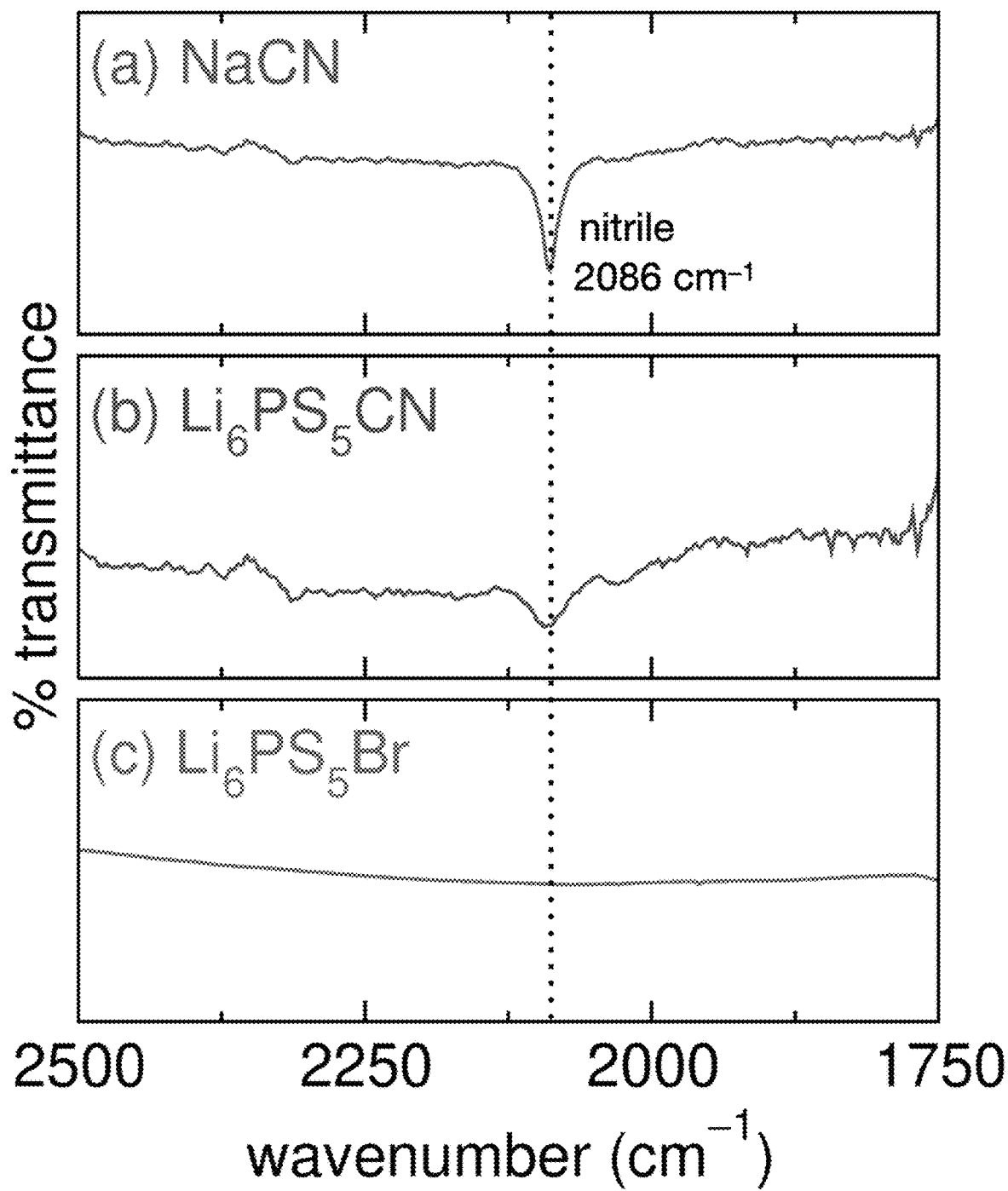
FIG. 4 depicts FTIR-ATR data collected for (a) sodium cyanide (NaCN), (b) the cyanide argyrodite ($Li_6PS_5CN$), and (c) the bromide argyrodite ($Li_6PS_5Br$). The dotted line is a guide to the eye to highlight the characteristic region for the nitrile stretch near 2086 $cm^{-1}$ present in both NaCN and $Li_6PS_5CN$, but not in $Li_6PS_5Br$.

In order to confirm that the cyanide ion was incorporated into the argyrodite structure, we performed FTIR-ATR measurements on powdered samples of Li6PS5CN. FIG. 4 shows the FTIR-ATR spectrum of Li6PS5CN compared to the spectra of NaCN (positive control) and Li6PS5Br (negative control). The FTIR spectra of Li6PS5CN and the positive control NaCN reveal a sharp feature at ~2086 cm−1, which is characteristic of the nitrile stretch and is similar to the reported value of 2065 cm−1 reported for ionically-bound cyanide.[34] As expected, the FTIR-ATR spectrum of Li6PS5Br (negative control) does not exhibit the nitrile stretch.

Figure 5:
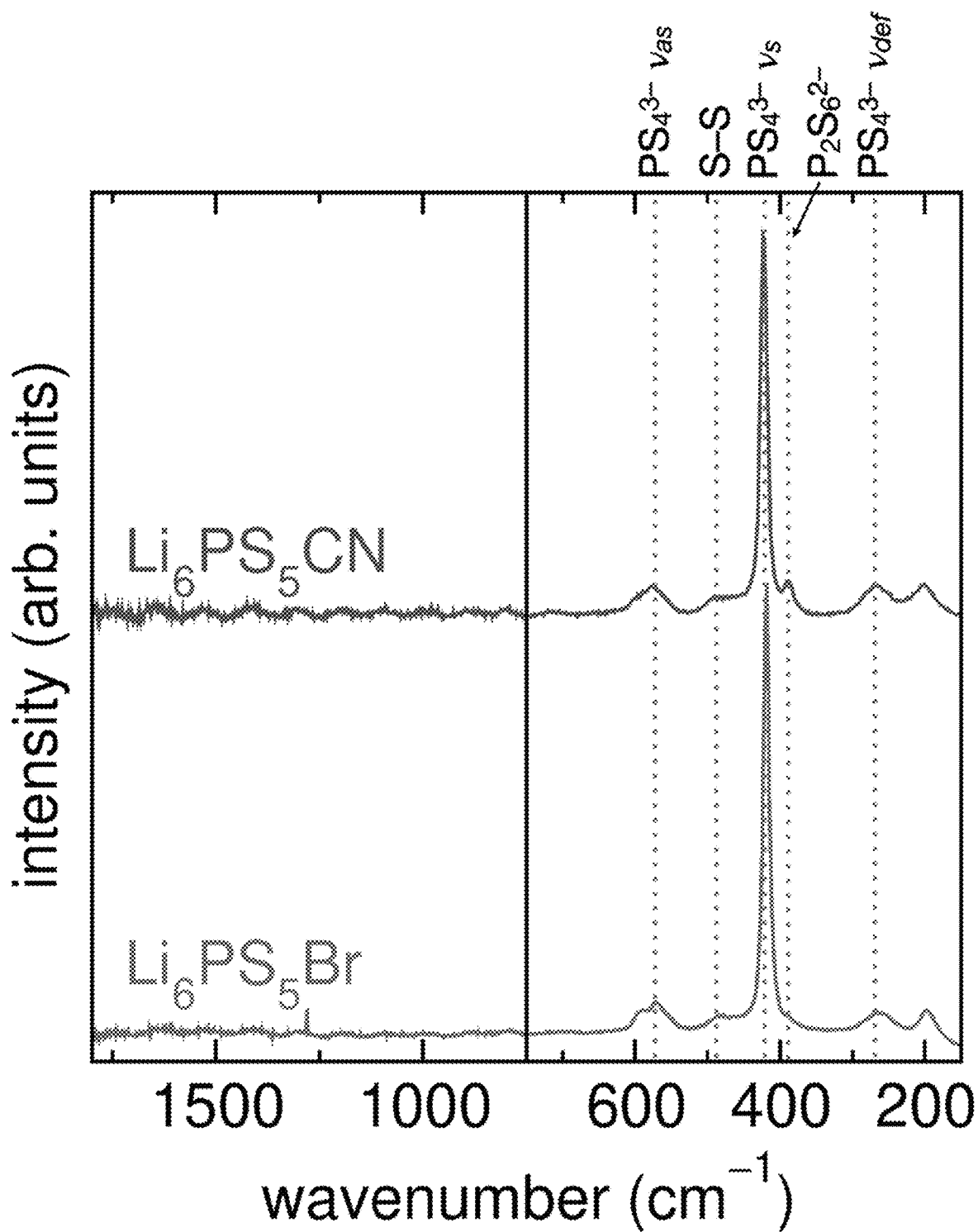
FIG. 5 depicts Baseline-subtracted Raman spectra of $Li_6PS_5CN$ and $Li_6PS_5Br$. The features are labeled with the assigned Raman modes. The x-axis is split to highlight the features at low wavenumbers.

Raman spectra of $Li_6PS_5CN$ and $Li_6PS_5Br$ are consistent with the formation of the argyrodite phases from the solution-phase synthesis (FIG. 5). The spectra for both compounds reveals several features consistent with the presence of $PS_4^{3-}$ tetrahedra, including the A1 symmetric stretch at ~413 cm$^{-1}$, the F2 asymmetric stretch at ~566 cm$^{-1}$, and the deformation mode at ~264 cm$^{-1}$.[15,35,36,37,38,39,40] We do not observe significant changes in the Raman spectrum between $Li_6PS_5Br$ and $Li_6PS_5CN$, which indicates that the vibrational properties of the $PS_4^{3-}$ tetrahedra in $Li_6PS_5CN$ are not altered significantly by the presence of the cyanide ion. Both compounds also show a weak feature at ~475 cm$^{-1}$ that has previously been assigned to S—S dimers.[37,39] We attribute this feature to the formation of S—S species that are well-known to form during solution-phase synthesis in ethanol and THF,[41] which is further supported by the emerald green color of the solution.[41,42] We also note the presence a small feature at ~384 cm$^{-1}$ in $Li_6PS_5CN$ that has previously been assigned to $P_2S_6^{4-}$ species.[35,36,38,39,43]? However, we do not observe any $P_2S_6^{4-}$-based crystalline phases in the high-resolution X-ray diffraction data which indicates that these phases are likely amorphous. $P_2S_6^{4-}$ species have previously been observed in the Raman spectra of $Li_6PS_5Br$ synthesized from ethanol[39] and in ball-milled mixtures of $Li_2S$, $P_2S_5$, and LiBr.[31] In these studies, this feature is reported to vanish upon high-temperature reaction/annealing, which suggests that high temperatures are necessary to remove these species regardless of the synthetic approach.

We further attempted to anneal Li6PS5CN at temperatures up to T=550° C. to improve crystallinity. However, we found that heating Li6PS5CN above T=150° C. resulted in a color change of the product from off-white to deep brown or black and decomposition of the product. Similarly, attempts to synthesize Li6PS5CN by solid-state reactions of the precursor binaries were also unsuccessful. Low temperatures (T=150° C.) were insufficient to promote adequate reactivity in the solid-state, but heating the reactants at higher temperatures only resulted in the formation of poorly-crystalline Li—P—S phases and the color change of the products to deep brown/black (Supporting Information, FIG. S1). Due to the thermal degradation of Li6PS5CN above T=150° C., we elected to forgo the annealing step (550° C., 48 h) that is typically employed for solution-synthesized halide argyrodites.[44]

Electrochemical Impedance Spectroscopy

Figure 6:
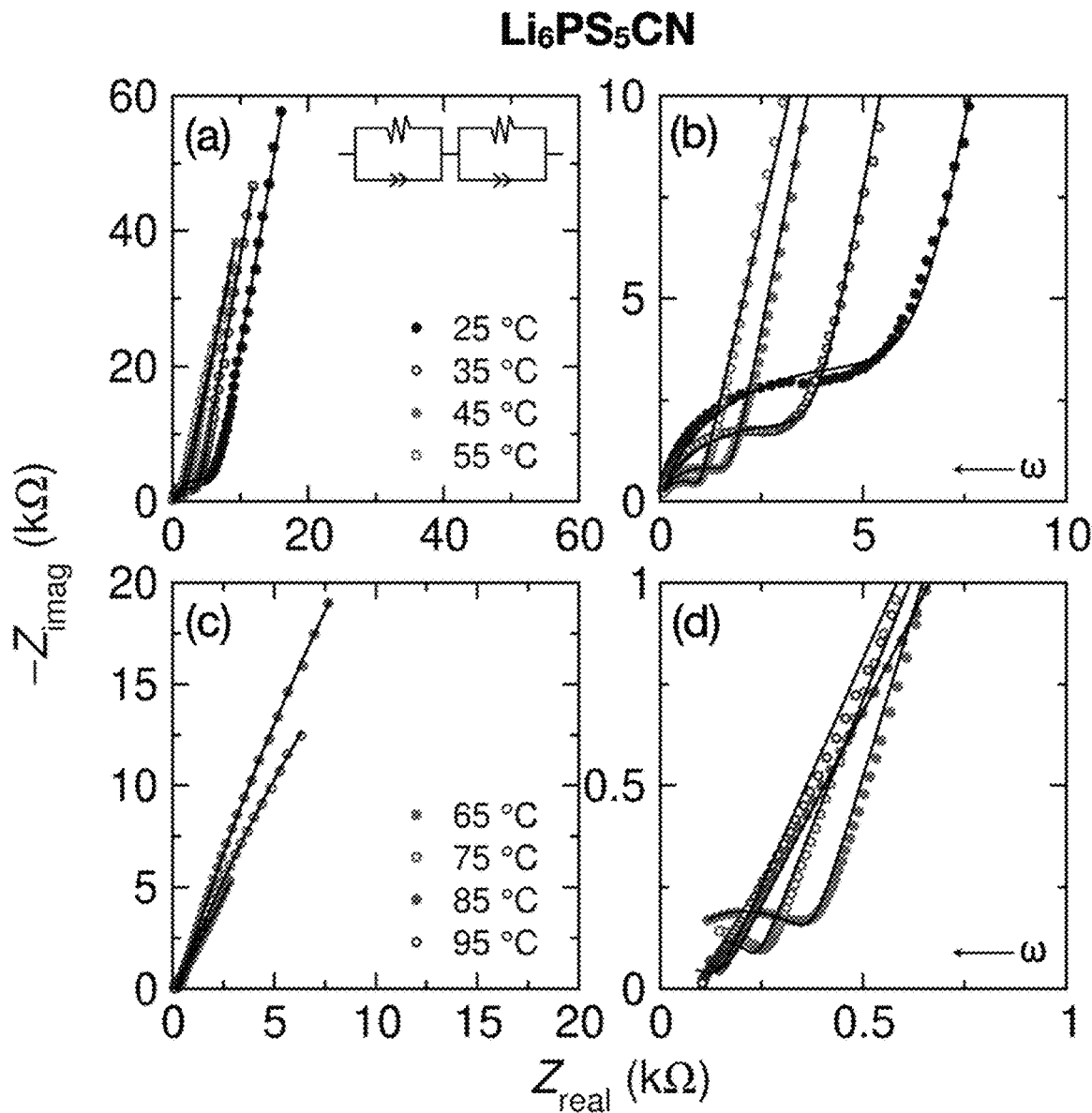
FIG. 6 depicts Representative Nyquist plots of temperature-dependent electrochemical impedance spectroscopy measurements of $Li_6PS_5CN$. Data are shown as circles and fits to the RQ+RQ equivalent circuit model are shown as black lines. Nyquist plots collected from T=25° C. to T=55° C. are shown in panels (a) and (b) while data collected from T=65° C. to T=95° C. are shown in panels (c) and (d). Panels (b) and (d) are zoom regions of the data in panels (a) and (c) to highlight the high-frequency RQ feature.
Figure 7:
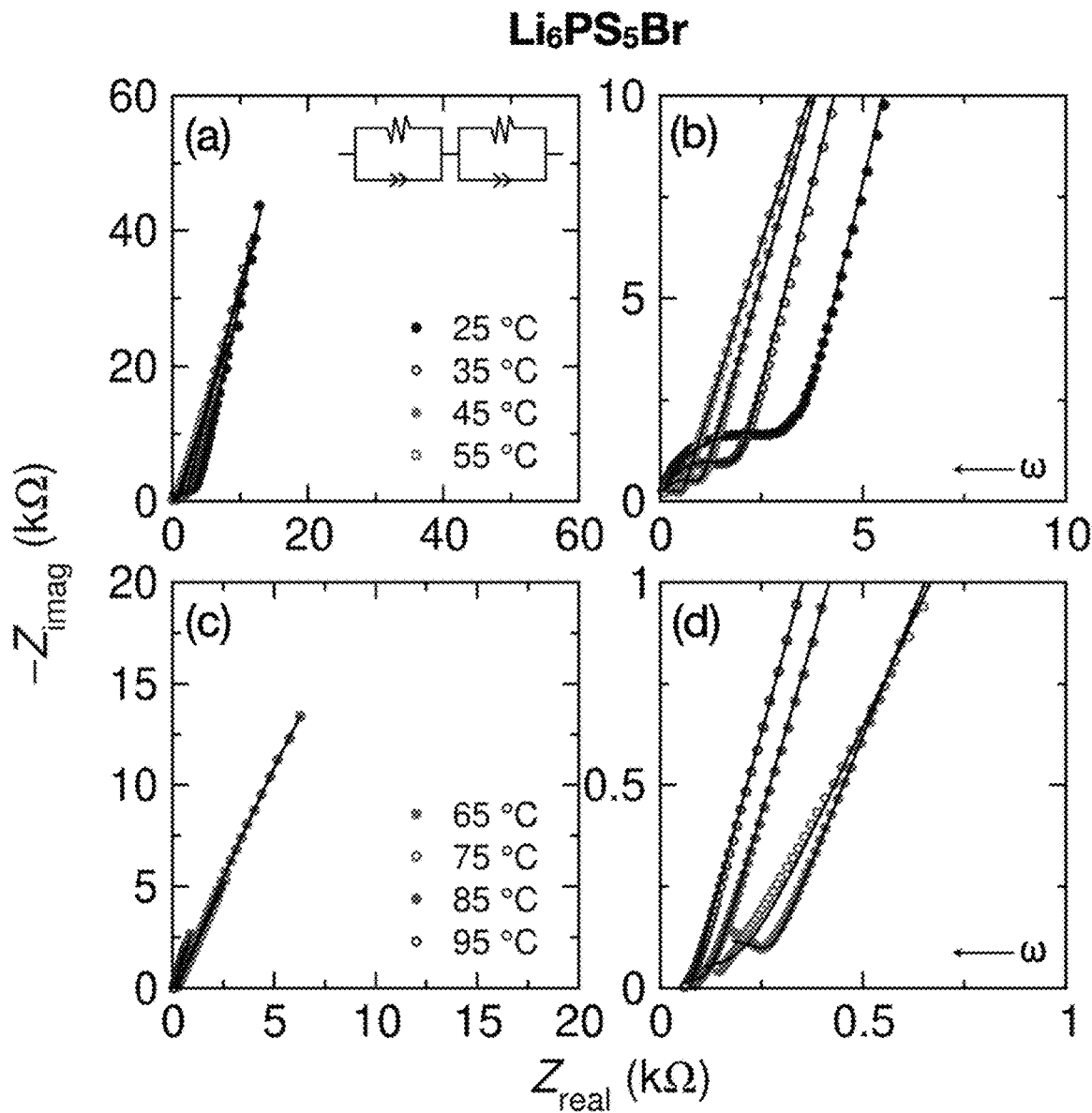
FIG. 7 depicts Representative Nyquist plots of temperature-dependent electrochemical impedance spectroscopy measurements of $Li_6PS_5Br$. Data are shown as circles and fits to the RQ+RQ equivalent circuit model are shown as black lines. Nyquist plots collected from T=25° C. to T=55° C. are shown in panels (a) and (b) while data collected from T=65° C. to T=85° C. are shown in panels (c) and (d). Panels (b) and (d) are zoom regions of the data in panels (a) and (c) to highlight the high-frequency RQ feature.

The lithium ion conductivity of the new argyrodite Li6PS5CN was determined by solid-state electrochemical impedance spectroscopy (EIS). For comparison, these measurements were also performed on the reported bromide argyrodite Li6PS5Br prepared by the same solution-phase method. Representative Nyquist plots of the real and imaginary contributions to the impedance for Li6PS5CN and Li6PS5Br are shown in FIG. 6 and FIG. 7, respectively. At room temperature, we observe a small-diameter semicircle at high frequencies (lower Zreal) and the onset of a large-diameter semicircle at lower frequencies (higher Zreal). In order to quantitatively understand these processes and their contributions to the impedance in Li6PS5CN and Li6PS5Br, we have modeled the data using the (RQ)+(RQ) equivalent circuit model shown in the insets of FIG. 6 and FIG. 7, where RQ represents a resistor (R) in parallel with a constant phase element (Q). A constant phase element was chosen in place of a capacitor to account for the imperfect interfaces between the In foil contacts and the pellet. We note that the lower-frequency RQ feature does not complete a full semicircle due to the large impedances at low frequencies. The diameter of the high-frequency semicircle decreases monotonically with increasing temperature, consistent with a thermally-activated process. Representative EIS fitting parameters for Li6PS5CN and Li6PS5Br at varying temperatures are recorded in Table S2 and Table S3. Measurements were performed on two replicate cells for both the cyanide and bromide argyrodites with two scans for each cell.

Figure 8:
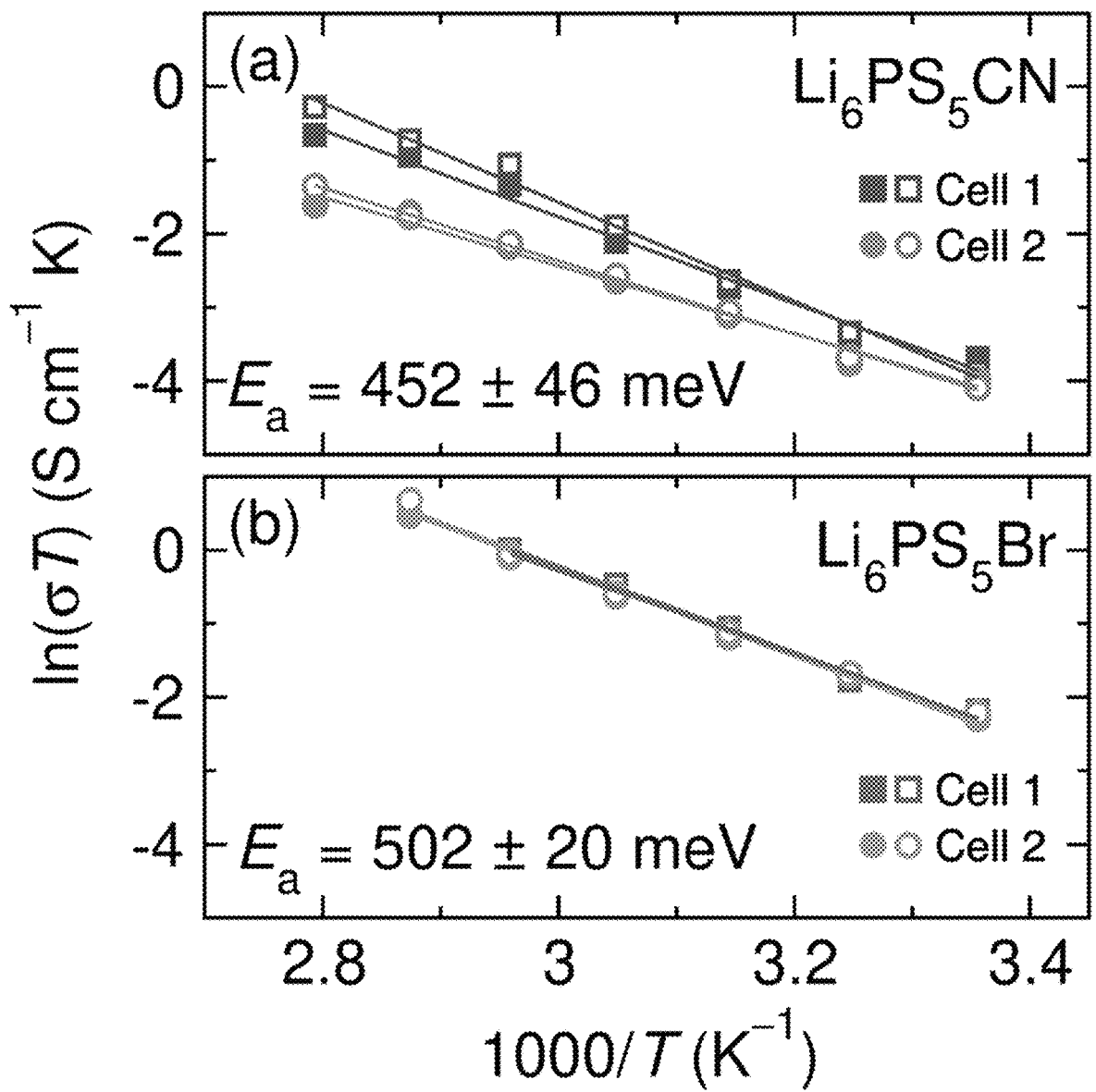
FIG. 8 depicts Arrhenius plots of solution-synthesized (a) $Li_6PS_5CN$ and (b) $Li_6PS_5Br$ from temperature-dependent impedance spectroscopy. Squares represent multiple measurements (filled and open) on cell 1, while circles represent multiple measurements (filled and open) on cell 2. The lines are corresponding linear regressions to the data.

The two features observed in the Nyquist plots are characteristic of two charge transfer processes occurring at different relaxation times. In Li6PS5CN and Li6PS5Br, we attribute the high-frequency RQ feature (low Zreal to bulk lithium ion conductivity and the low-frequency feature to grain-boundary conductivity, which is consistent with interpretations of Nyquist plots of other sulfide-based ion conductors.[8,14,31,45] Using this interpretation, we find average room-temperature bulk lithium-ion conductivities of 0.9(1) mS cm−1 and 4.2(2) mS cm−1 for Li6PS5CN and Li6PS5Br, respectively. To determine the activation barriers for bulk lithium-ion conductivity, we extracted the conductivities from the high-frequency RQ feature as a function of temperature. As shown in FIG. 8, the conductivities follow a linear relationship on a plot of $\ln(\sigma T)$ vs T−1, and the activation energy for ionic conductivity was determined using the Arrhenius-type relationship $\ln(\sigma T)=-E_A/(k_BT)+\ln(\sigma 0)$, where EA is the activation energy (slope) and σ0 is the Arrhenius-like prefactor (y-intercept). This formalism of the Arrhenius equation accounts for the energies of the jump barrier between two neighboring sites and the formation of vacancy-interstitial defect pairs required for ionic diffusion to occur.[46] From linear fits to these data, we find that the average activation barrier for ionic conductivity in Li6PS5CN (EA=452±46 meV) is lower than that of the bromide analog Li6PS5Br (EA=502±20 meV) that was prepared and measured by the same methods. While it is initially surprising that Li6PS5CN exhibits lower room temperature ionic conductivity compared to Li6PS5Br, this observation can be explained by the Meyer-Neldel enthalpy-entropy compensation rule, which states that higher activation barriers are typically accompanied by larger Arrhenius prefactors and thus a higher ionic conductivities.

Figure 9:
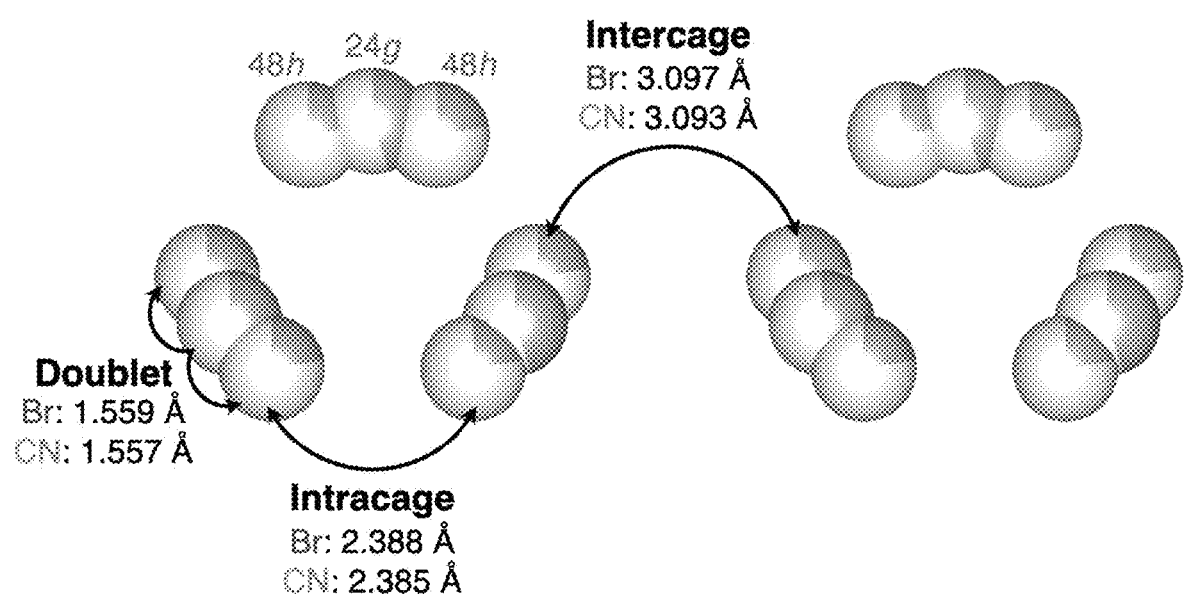
FIG. 9 depicts Structural representation of the lithium conduction pathway in the argyrodites. The jump distances in $Li_6PS_5Br$ and $Li_6PS_5CN$ determined from the crystal structures refined from the SXRD data are denoted in the figure. The Li ions are represented by green spheres. The errors in the jump distances are taken to be the errors in the lattice parameters: $\Delta\delta(Li_6PS_5CN)=6\times10^{-6}$ Å, $\Delta\delta(Li_6PS_5Br)=7\times10^{-6}$ Å.
Figure 10:
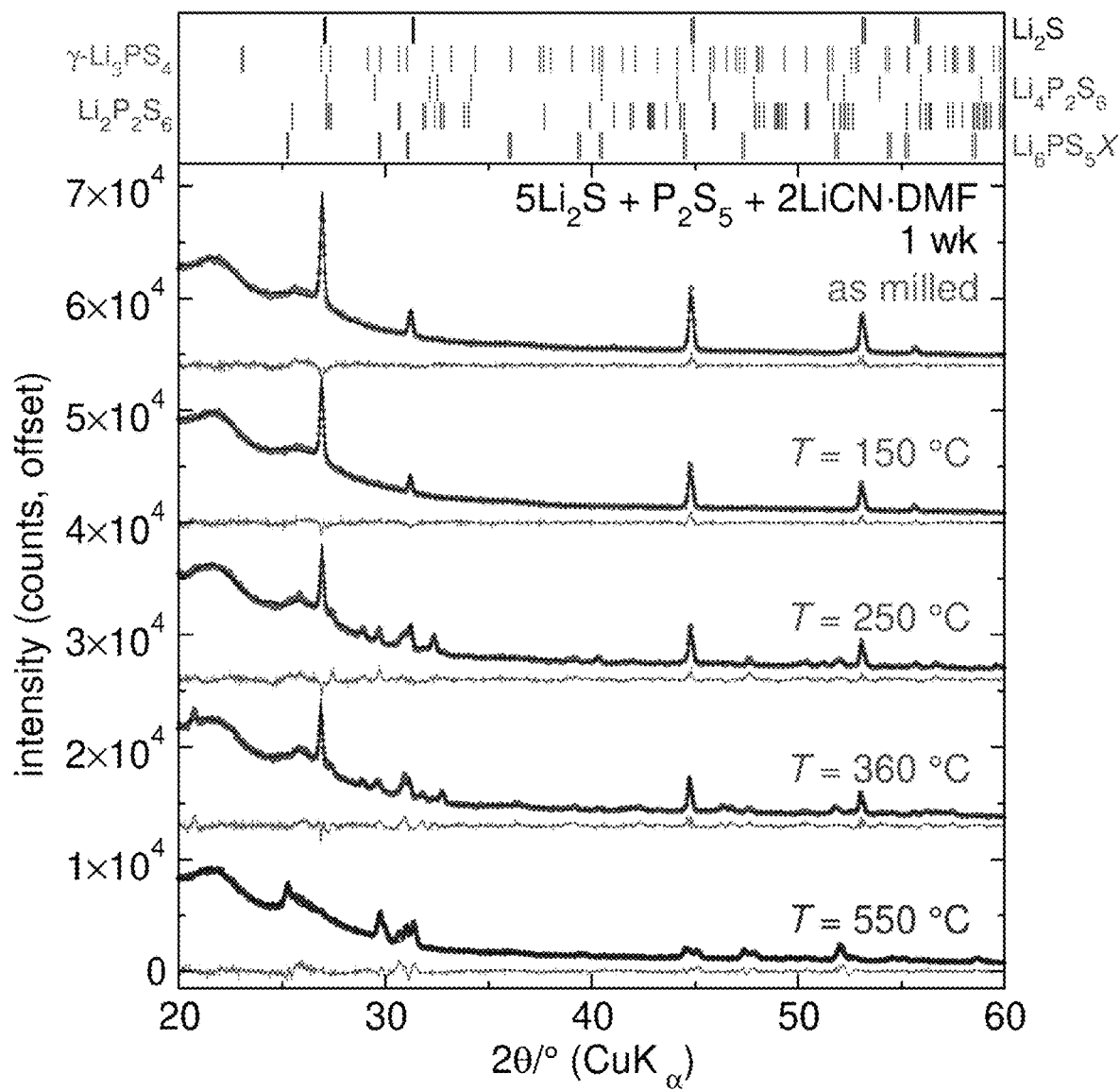
FIG. 10 depicts Powder X-ray diffraction patterns of the products of solid-state synthesis attempts of the cyanide argyrodite $Li_6PS_5CN$. The binary precursors were milled in a high-energy ball mill and then reacted at varying temperatures in a carbon-coated quartz ampoule. The tick marks in the top panel represent the positions of anticipated reflections for various phases identified by Rietveld refinements. Rietveld refinements were performed to identify the presence and phase fraction of the phases shown in the top panel. Data are shown as colored circles, the fits are shown as black lines, and the difference curves are shown as grey lines beneath the respective diffraction patterns.

In order to understand the impact of cyanide incorporation upon the ionic conduction properties, we first consider the differences in the structures, lithium conduction pathways, and Li—Li jump distances in Li6PS5CN compared to Li6PS5Br. In the argyrodite structure, there are several potential jumps between Li sites, including an including an "intracage jump" between adjacent 48 h-48 h sites, a "doublet jump" from 48 h-24 g-48 h sites, and an "intercage" jump between neighboring Li cages in the structure (FIG. 9).[14] Using the crystal structures refined from the SXRD data, we determined the jump distances for each of these pathways for both Li6PS5CN and Li6PS5Br. As shown in FIG. 9, the similar lattice parameters between the bromide and cyanide materials result in nearly identical Li jump distances for each pathway due to the similar ionic radii of bromide and cyanide. As the jump distances between adjacent lithium sites in the crystal are nearly identical between Li6PS5CN and Li6PS5Br, we can rule out the effects of volume changes as an explanation for the differences in activation barrier between these two materials.

The presence of the asymmetric cyanide ion likely increases the polarizability of the argyrodite framework to screen the charge of the lithium ions from the surrounding lattice and lower the activation buriers for ionic conductivity in Li6PS5CN. Cyanide presents a large quadrupolar moment due to the non-spherical shape of the molecule.48 In ionic crystals such as KCNxBrl-x49 and RbCN,50 the presence of the quadrupolar cyanide ions leads to a higher dielectric constant, owing to the reorientational degrees of freedom that enable the cyanide ion to align under an applied electric field. In general, superionic conductors with higher dielectric constants and lower-frequency phonon modes tend to exhibit lower activation barriers for ionic conductivity.13,51 Taken together, these data support the notion that the polarizability of the cyanide ions may be responsible for the lower activation barriers in Li6PS5CN.

Molecular dynamics of the cyanide ion may also contribute to the lower activation barrier in Li6PS5CN. Cyanide ions are well-known to undergo reorientational dynamics in plastic crystals such as the alkali cyanides (e.g., NaCN, KCN) with a dipole relaxation rate of ~1010 s-1,52 which is on a similar timescale to the fast lithium hopping (109 s−1) observed in Li6PS5Br.4 Further, rotational disorder of CN— anions has been implicated in the sodium-ion conductivity of Na3OCN.23 Given the similar timescales for these two dynamic processes in other materials systems and the precedent for these coupled dynamics in other ionic conductors, it is feasible that these processes are dynamically coupled in the cyanide argyrodite Li6PS5CN. This notion is further supported by the high-resolution powder X-ray diffraction data of Li6PS5CN (FIG. 2), which indicate that the cyanide ions are orientationally disordered in the crystal. In the absence of coupled Li—CN dynamics, dynamic disorder of the cyanide ions in Li6PS5CN can reduce the activation barrier for ion diffusion by introducing spatial and temporal variation of the energetic landscape experienced by the lithium ions. This explanation has been invoked to explain the interplay of BH4-rotations and lithium diffusion in the antiperovskite Li3OBH4.21 Although we cannot easily deconvolute the contributions from lattice polarizability and molecular dynamics, this study demonstrates that the cyanide ion moderates the potential energy landscape surrounding the mobile lithium ions in Li6PS5CN to lower the activation barrier for ionic conductivity compared to the champion argyrodite Li6PS5Br.

CONCLUSIONS

We have prepared the new argyrodite solid-state electrolyte Li6PS5CN containing the cyanide ion at the halide site within the structure. From high-resolution powder X-ray diffraction data, we find that Li6PS5CN and Li6PS5Br adopt nearly identical crystal structures due to the similar ionic radii of cyanide and bromide. In Li6PS5CN, the cyanide ions are orientationally disordered in the crystal structure, which may originate from reorientational dynamics of the cyanide ion. Through electrochemical impedance spectroscopy, we demonstrate that the activation barrier for lithium-ion migration in Li6PS5CN is lower than the champion argyrodite Li6PS5Br. We attribute the lower activation barriers to softening of the energetic landscape of Li6PS5CN due to the presence of the cyanide ion and further discuss potential mechanisms by which the cyanide ion lowers the activation barrier for lithium ion migration in Li6PS5CN. Prior to this study, Li6PS5Br boasted the lowest activation barriers for ionic conductivity in the halide argyrodite family and the lower activation barrier observed in the new cyanide argyrodite Li6PS5CN represents an exciting development in this family of solid electrolytes and for potential applications in all-solid-state batteries.

Methods and Materials

All manipulations of reactants and products were performed in an argon glove box to mitigate exposure to atmospheric air and water. For manipulation of cyanide-containing materials, a hand-held hydrogen cyanide gas detector was employed to monitor the presence of HCN gas.

Preparation of LiCN·02595DMF

Lithium cyanide was prepared following the solution-phase metathesis method previously described by Markley, et al.34 Briefly, 0.041 mol of LiCl and 0.041 mol of NaCN were added to a dry 100 ml Schlenk flask. Prior to reacting, LiCl was ball-milled (45 ml zirconia jar, 180×5 mm zirconia balls) using a Fritsch Pulverisette 7 high-energy planetary ball mill at a rotation speed of 400 rpm (4 cycles of 15 min on, 15 min rest), while NaCN was hand-ground in an agate mortar and pestle to reduce particle size. The Schlenk flask was connected to an N2 Schlenk manifold. To a 100 ml Schlenk flask was add 60 ml of anhydrous N,N-dimethylfonnamide (DMF) via cannula. The solution was sealed and stirred under static N2 for 4 d. After 4 d, the stirring was turned off and the remaining white solid was allowed to settle. The solution was transferred via cannula filtration into a dry 250 ml Schlenk flask. Dry diethyl ether was added via cannula to double the volume resulting in a fine white precipitate. The supernatant was discarded and the white product was washed twice with diethyl ether. The remaining white LiCN-0.2595DMF powder was dried under vacuum.

Solution-Phase Preparation of Li6PS5Br

Li6PS5Br was prepared by the solution-phase method described by Yubucbi et al.44 To a dry 100 ml Schlenk flask was added 0.2885 g P2S5 (1.3 mmol) and 0.1790 g (3.9 mmol) of Li2S. The flask was connected to an N2 Schlenk manifold and kept under flowing N2 for the duration of the experiment. Approximately 20 ml of anhydrous tetrahydrofuran (THF) was added via cannula, and the solution was stirred for 1-1.5 h to form a yellow suspension. To a second dry 100 ml Schlenk flask was added 0.2258 g (2.6 mmol) LiBr and 0.1193 g (2.6 mmol) Li2S. Approximately 20 ml of dry ethanol was added via cannula and stirred to dissolve into a clear solution. The ethanolic solution was then transferred to the THF solution via cannula to yield an emerald green transparent solution. The combined solution was then stirred for an additional 20 min. The solvent was evaporated under vacuum while the flask was gently heated using a heating mantle. Initially, the solvent was allowed to evaporate at 50° C. for 30 min. The temperature was then increased to 80° C. and held for an additional 30 min. At this point, a white precipitate began forming in the flask. The temperature was then increased to 100° C. and held for 30 min to yield a white powder. The flask was then heated at 150° C. for 1 h.

Solution-Phase Preparation of Li6PS5CN

Li6PS5CN was prepared by modification of the solution-phase synthesis of Li6PS5Br reported by Yubuchi, et al.44 To a dry 100 ml Schlenk flask was added 0.2701 g P2S5 (1.2 mmol) and 0.1673 g (3.6 mmol) of Li2S. The flask was connected to an N2 Schlenk manifold and kept under flowing N2 for the duration of the experiment. Approximately 20 ml of anhydrous tetrahydrofuran (THF) was added via cannula, and the solution was stirred for 20 min to form a yellow suspension. To a second dry 100 ml Schlenk flask was added 0.1262 g (2.4 mmol) LiCN.0.2595DMF and 0.1116 g (2.4 mmol) Li2S. Approximately 20 ml of dry ethanol was added via cannula and stirred to dissolve into a clear solution. The ethanolic solution was then transferred to the THF solution via cannula to yield an emerald green transparent solution. The combined solution was then stirred for an additional 20 min. The solvent was evaporated under vacuum while the flask was gently heated using a heating mantle. Initially, the solvent was allowed to evaporate at 50° C. for 30 min. The temperature was then increased to 80° C. and held for an additional 30 min. At this point, a white precipitate began forming in the flask. The temperature was then increased to 100° C. and held for 30 min to yield a white powder. The flask was then heated at 150° C. for 1 h. While the literature preparation for Li6PS5Br includes an annealing step (T=550° C., 48 h) in a fused quartz ampoule,44 we have elected to forgo this step due to decomposition of Li6PS5CN at elevated temperatures.

Characterization

Structural Characterization

Laboratory powder X-ray diffraction data were collected on a Rigaku Dmax diffractometer in Bragg-Brentano geometry equipped with a rotating Cu anode. Powdered samples were mounted on a zero-diffraction Si substrate and sealed under Kapton® tape to prevent exposure to atmosphere during the measurement.

High-resolution synchrotron powder X-ray diffraction (SXRD) data were collected on the 11-BM-B beamline at the Advanced Photon Source, Argonne National Laboratory. Powdered samples of Li6PS5CN and Li6PS5Br were packed into quartz capillaries (OD: 0.70 mm, ID: 0.69 mm). The capillaries were sealed with two-part epoxy and then sheathed inside 0.8 mm Kapton® capillaries and sealed with a clay plug to prevent air exposure.

All diffraction data were analyzed by the Rietveld method implemented in TOPAS Pro. VESTA was used to visualize and render all crystal structures presented in this publication.53

Ionic Conductivity

The bulk lithium ion conductivities and activation barriers of Li6PS5CN and Li6PS5Br were determined through ac potentiostatic electrochemical impedance spectroscopy (EIS). The cells were assembled in a parallel-plate capacitor geometry with a two-electrode configuration as previously described by Martinolich et al.45 Approximately 35 mg of the powdered materials were pressed uniaxially in a 6 mg die press at 100 bar (10 MPa) for 2 min, which yielded thin cylindrical samples with thickness on the order of ~0.03 in (~0.6 mm). The pellets were then isostatically pressed at 30 MPa in a cold isostatic press for 30 min to densify the pellets. The EIS cells were assembled in 0.25 in stainless steel Swagelok cells within an argon-filled glove box. The stainless steel Swagelok body was lined with Kapton® film to electrically insulate the cell body from the electrodes and sample. Polished indium foil contacts (thickness=0.1 mg, diameter=6 mg) were used as blocking electrodes. Stainless steel plungers (diameter=0.25 in) were pressed firmly against either side of the pellet and foil contacts to encourage electrical contact and the cells were sealed tightly with teflon Swagelok ferrules prior to measurements outside of the glove box to prevent air exposure. To encourage good contact between the pellet and the contacts during measurements, the cells were placed in a vice and all measurements were collected under gentle pressure (≤1 kN), as measured by an in-line load cell. Potentiostatic EIS measurements were collected on a BioLogic VMP3 potentiostat. The frequency was swept logarithmically from 500 mHz to 1 MHz with an applied bias of 50 mV and data were collected at 20 measurements/decade. The data were modeled with equivalent circuits using ad hoc Python code to extract the various contributions to the impedance. Temperature-dependent measurements were performed by placing the EIS cells within a convection oven set to the desired temperature. The cells were allowed to equilibrate for 15 min once the temperature of the oven had stabilized at the desired temperature. Measurements were repeated twice at each temperature to ensure steady-state conditions, and the bulk and grain-boundary contributions to the ionic conductivity and standard deviations at each temperature was determined by the average of the measurements. The activation barriers for ionic conductivity and associated standard deviations were determined by measurements of two replicate cells.

FTIR-ATR and Raman Spectroscopy

Powder FTIR-ATR measurements were performed using a home-built air-free ATR cell. The powder was compressed between a 0.5 mm stainless steel separator disk and a germanium ATR crystal and sealed within a PEEK exterior that was then mounted in the instrument. FTIR spectra were collected on a Nicolet 6700 FTIR with a Smart iTx ATR attachment (45° angle of incidence) using the empty ATR cell containing the argon glove box atmosphere as the background. Each spectrum reported is the average of 100 spectra. After collection, the background was fit to an exponential function and subtracted.

Raman spectra were collected using a Renishaw inVia confocal Raman microscope equipped with an Nd YAG 532 mm excitation laser and a Leica N PLAN EPI 20x/0.40 objective. Laser power of 0.5 mW was used. Spectra were obtained with 3 s exposure time and 50 accumulations. The powder sample was contained in a custom designed air-tight cell with fused quartz windows to avoid air exposure during the measurements.

The foregoing disclosure has been set forth merely to illustrate the invention and is not intended to be limiting.

I claim:

1. A solid electrolyte comprising $Li_6PS_5CN$ wherein the bulk lithium activation barrier for lithium ion conductivity is less than about 242 meV.

2. The solid electrolyte of claim 1 wherein the bulk lithium ion conductivity at 35 degrees Celsius is up to $1.0 \times 10^{-5}$ S/cm.

3. A method for making $Li_6PS_5CN$ wherein the $Li_6PS_5CN$ exhibits a cubic argyrodite structure comprising a F-43m space group wherein the method comprises the steps of first reacting $P_2S_5$ and $Li_2S$ in THF for a first reaction solution and separately reacting LiCN and $Li_2S$ in ethanol for a second reaction and then combining the first reaction and the second reaction into the same reaction vessel for a third reaction and wherein the third reaction is dried under vacuum at a temperature of less than 150 degrees Celsius and then isolating the $Li_6PS_5CN$.

* * * * *